Nov. 10, 1959  R. BARRADELL-SMITH  2,911,760
APPARATUS FOR PRODUCING A CONTINUOUS RIBBON OF GLASS
Filed Oct. 31, 1955  2 Sheets-Sheet 1
FIG. 1.
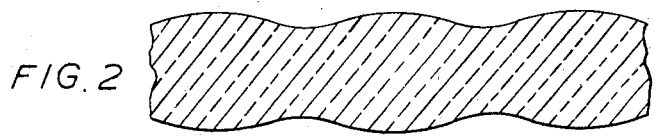
FIG. 2.
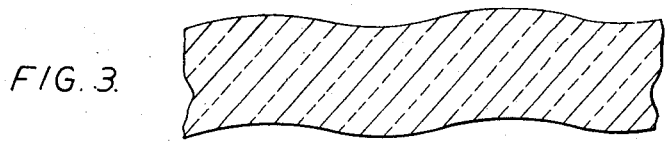
FIG. 3.
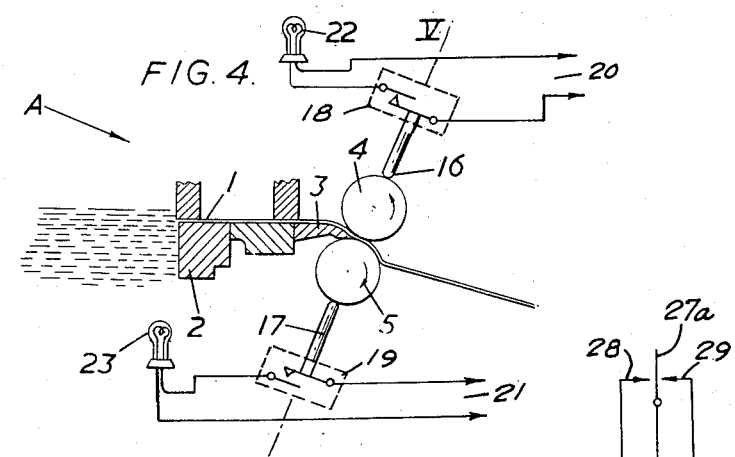
FIG. 4.
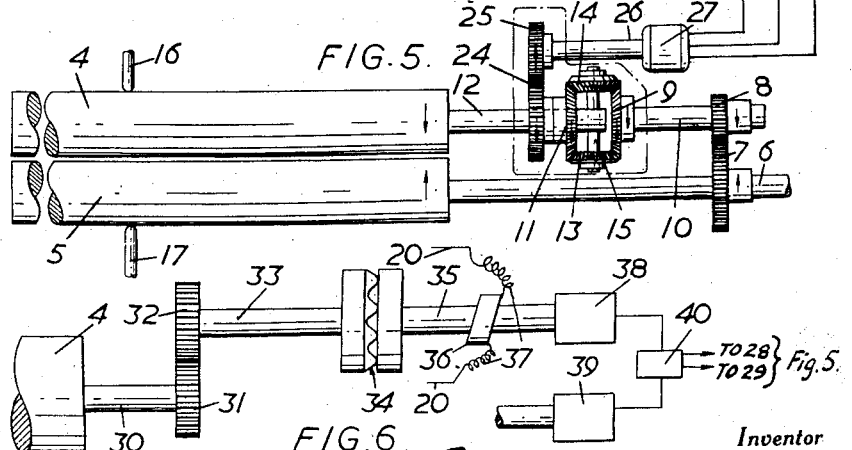
FIG. 5.
FIG. 6.
Inventor
Richard Barradell-Smith
By
Morrison Kennedy Campbell
Attorneys

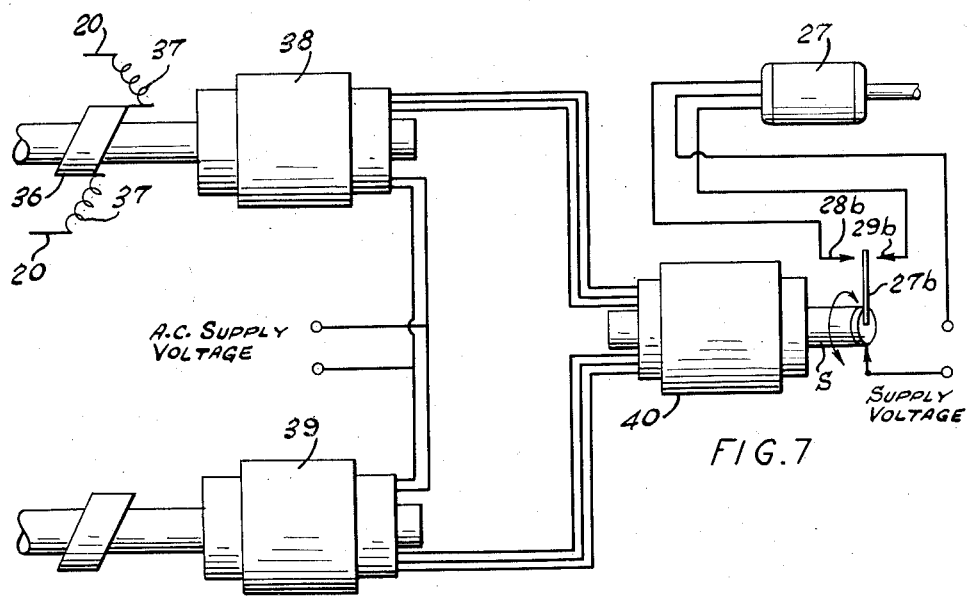
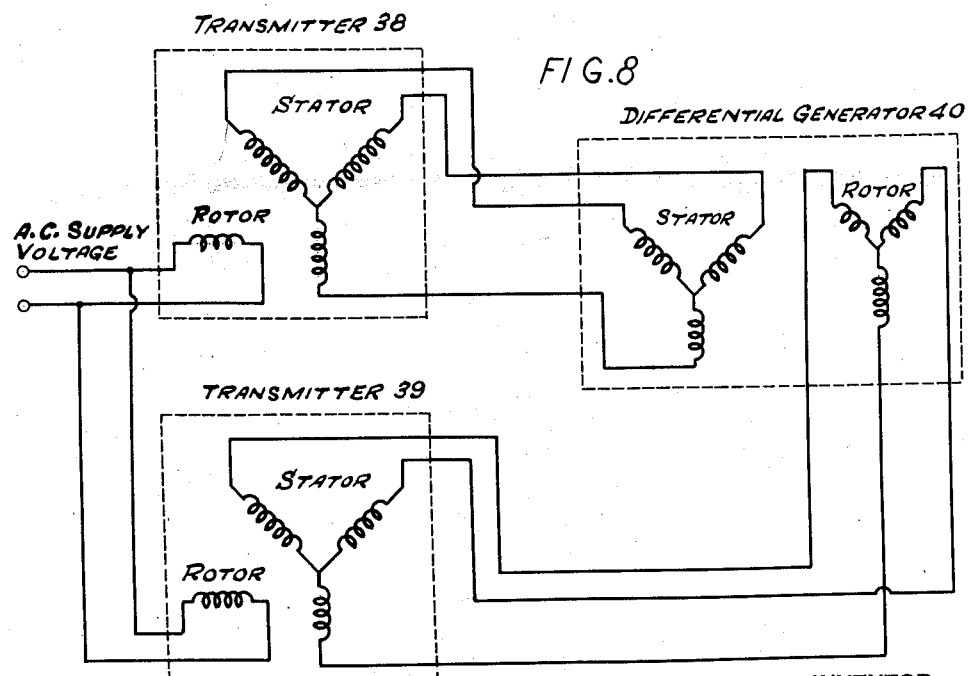

United States Patent Office 2,911,760
Patented Nov. 10, 1959

2,911,760

APPARATUS FOR PRODUCING A CONTINUOUS RIBBON OF GLASS

Richard Barradell-Smith, St. Helens, England, assignor to Pilkington Brothers Limited, Liverpool, England, a British company Application October 31, 1955, Serial No. 543,982

Claims priority, application Great Britain November 3, 1954

9 Claims. (Cl. 49—33)

This invention relates to an apparatus for producing a continuous ribbon of glass.

A continuous ribbon of glass is usually made by flowing molten glass between a pair of casting rolls, usually internally water-cooled rolls which are slow moving members rotating at a speed of the order of one to ten revolutions per minute. The spacing of the rolls is predetermined so that when the rolls are straight the glass ribbon formed thereby issues from the pass therebetween as a ribbon of substantially constant intended thickness. The casting rolls, however, sometimes have a tendency to bend axially when in use owing to a number of causes or combinations of causes, some of which are mentioned below. When bending of the rolls occurs the shape of the pass between the rolls varies and results in the production of a cyclic variation in the thickness of the glass ribbon being produced and this, as will be understood, is an undesirable feature.

A roll may bend as a result of any of the following causes or of combinations of such causes: local differences in the surface emissivity of the cylinder, local differences in the co-efficient of heat transfer from the molten glass to the roll, variations in the roll wall thickness, local variations in the co-efficient of heat transfer from the roll bore to the cooling water, local variations in the conductivity of the roll material, local variations in the specific gravity of the roll material, local variations in the flow of the internal cooling water, or distortion due to ageing of the roll material.

It is a main object of the present invention to provide an apparatus for determining when the rolls bend and as a consequence of such determination so to adjust the rolls angularly one to the other that they are brought into a phase relationship one to the other such that the outward bend of one roll substantially coincides with the inward bend of the other roll when forming the pass between the rolls so that the maximum departure from intended ribbon thickness approximates to the difference between the extent of bending of the rolls.

In order that the invention may be clearly understood some embodiments thereof will now be described, by way of example, with reference to the accompanying diagrammatic drawings, in which:

Fig. 1 is a cross-section taken lengthwise of a continuous ribbon of glass formed by a pair of bent rolls not in phase, the upper roll having a somewhat less diameter than that of the lower roll, Fig. 2 is a further cross-section taken lengthwise of a continuous ribbon of glass formed by a pair of bent rolls of equal diameter and also not in phase, Fig. 3 is a still further cross-section taken lengthwise of a continuous ribbon of glass but formed by bent rolls of equal diameter in phase, Fig. 4 is a cross-section through a portion of a machine for producing a continuous ribbon of glass, Fig. 5 is a view on the line V—V and looking in the direction of arrow A, Figure 4, Fig. 6 illustrates an alternative means for effecting roll phase relationship, and Fig. 7 shows in greater detail the means generally illustrated at the right hand side of Fig. 6; and Fig. 8 shows an electrical diagram thereof.

In the drawings like references designate similar parts.

Referring to the drawings, Figure 1 illustrates, with some exaggeration for clarity, the unevenness in thickness which occurs in a continuous ribbon of glass rolled between a pair of casting rolls which are bowed or bent to the normal axes of rotation thereof, which are of unequal diameters, and which run so that the outward bend of one roll is out of phase with the inward bend of the other. The unevenness of thickness in the ribbon under such conditions will vary cyclically from the intended thickness thereof to varying extents as illustrated diagrammatically in Figure 1.

If, however, the rolls, although bent, are of the same diameter and are rotated at the same angular velocity the rolls will be in a constant phase relationship which will ensure that the profiles of the two surfaces of the glass ribbon will have the same wavelength so that the thickness of the ribbon will vary as illustrated in Figure 2.

Figure 3, which is also exaggerated, illustrates how when the rolls are of the same diameter and are rotatable at the same angular velocity, and the phase relation of the rolls is adjusted, as described below, so that the maximum departure from intended ribbon thickness approximates to the difference between the extent of lengthwise bowing or bending of the rolls, the thickness variations can be reduced to a minimum and the ribbon undulations are such that they usually will be stretched out by ribbon tension in the lehr.

Figures 4 and 5 illustrate apparatus according to the invention which is, in part, manually manipulated.

Referring to Figure 4, molten glass 1 is fed from a forehearth 2 over a spout 3 and is flowed between a pair of internally water-cooled casting rolls consisting of a first roll 4 and a second roll 5 of equal diameter. The rolls 4, 5 are rotated about their axes at equal angular velocities by driving means which includes a shaft 6, Figure 5, driven by a prime mover such as an electric motor, not shown, gears 7 and 8 of which gear 7 is secured to the shaft 6 on which roll 5 is mounted, and differential gearing described below.

The differential gearing comprises an input sun gear 9 secured to a shaft 10 rotatable by the gear 8, an output sun gear 11 freely rotatable on a shaft 12 to which roll 4 is secured for rotation, and two planet gears 13, 14 meshing with sun gears 9, 11 and freely rotatable on a cross-shaft 15 carried by the shaft 12. As can be seen from Figure 5 the sun and and planet gears are all bevel gears and the arrangement is such that the sun gears 9, 11 are identical gears while the gears 7 and 8 have a 2:1 ratio. Thus under normal operating conditions the sun gear 9 is driven at twice the angular velocity of the second roll 5, the sun gear 11 remains stationary relative to planet gears 13, 14, and roll 4 is rotated by gear 8, shaft 10, sun gear 9, planet gears 13, 14, and cross-shaft 15 so that the rolls 4, 5 normally rotate at substantially equal angular velocities but in opposite directions as required for forming a continuous ribbon of glass, and continue so to rotate until lengthwise bending of the rolls is detected.

For the purpose of detecting bending of the rolls, the roll 4 has a first sensing device 16, such as a resiliently loaded feeler, continuously co-operating therewith and arranged for actuation by an outward bend thereon, and the roll 5 has a second sensing device 17 also continuously co-operating therewith but arranged for actuation by an inward bend thereon. The sensing devices are disposed in the plane containing the axes of the rolls and are operatively connected respectively with a first and a second signal-initiating means formed by electric switch mechanisms 18, 19 electrically connected in the circuits 20, 21 of indicators shown in Figure 4 as electric lamps 22, 23. The lamps are distinctive one to each roll being, for this purpose, of different colours, for example the lamp 22 for roll 4 may be red and the lamp 23 for roll 5 may be green. By watching the lamps 22, 23 the machine operator is visually advised when one or both rolls become subject to axial bending and there is provided mechanism, about to be described, whereby, if the lamps are not operating simultaneously, the angular velocity of one of the rolls can be temporarily varied relative to that of the other until the rolls are in phase relation, as described above, such that the maximum departure from intended ribbon thickness due to such bending approximates to the difference between the extent of bending of the rolls, this condition being indicated to the operator by the simultaneous lighting of lamps 22, 23.

To permit the operator to effect the said temporary variation between the angular velocities of the rolls 4, 5 there is provided a normally inoperative auxiliary driving means comprising a pair of gear wheels 24, 25, Figure 5, of which the gear 24 is angularly movable with output sun gear 11 and the wheel 25 is secured to a shaft 26 rotatable by a reversible electric motor 27 which constitutes a prime mover for the auxiliary driving means selectively operable independently of the prime mover, not shown, for the roll driving means described above.

Selective operation of motor 27 by the operator is effected by a switch arm 27a movable between switch contacts 28, 29, Figure 5, in parallel in the motor circuit and marked to correspond to the coloured lamps 22, 23, and the motor 27, when operated, rotates shaft 12, through the differential gearing thereby to add to or subtract from the angular velocity of the shaft 10 according to the direction and magnitude of rotational movement imparted to the sun gear 11 by motor 27 the magnitude of advance or retardation of the roll 4 being one-half that of the rotation of sun gear 11. The operator maintains the motor 27 in operation until the two lamps 22, 23 are seen to light-up at the same time, thus indicating that the rolls are in the phased relation such as will minimize departure of the ribbon from the intended thickness thereof and the operator then stops motor 27 until he observes from lamps 22, 23 that the rolls have again got out of phase because of a new difference of bending of the rolls. Thus, if, for example, the bend in the roll 4 is ahead of that in the roll 5, the red lamp will light first and the operator closes the correspondingly coloured switch. This completes the circuit of the electric motor 27 which thus rotates in the direction necessary to retard the roll 4. The operator allows the motor to run until the two lamps are alight at the same time showing that the rolls are in the desired angular phase relationship; he then reopens the red switch and the electric motor 27 stops. Similarly, if the green lamp lights up first the operator closes the green switch and keeps it closed until the motor 27, rotating in the opposite direction to that just described, has speeded up the roll 4 until the two lamps are again alight at the same time.

To provide a finer degree of control of the angular phase change the ratio of the gears of the auxiliary driving gears 24, 25 can be increased.

Variation of the angular velocity of roll 4 has been described above as by manual manipulation, it will, however, be understood that the sensing devices 16, 17 may be arranged to effect operation of any suitable means co-operating with the motor 27 automatically to effect selective operation thereof and Figure 6 illustrates a part of one form of mechanism which may be employed automatically to effect selective operation of motor 27.

Each of the rolls 4, 5 is provided with a lay shaft 30 rotatable at the same angular velocity as that of its roll and which through 1:1 gears 31, 32 drives a shaft 33. The shaft 33, through a clutch 34, drives a further shaft 35 which carries an armature 36 surrounded by a system of stationary field coils 37. The armature 36 and coils 37 are of such a kind that, on energisation of the system, the shaft 35 takes up a unique angular position relative to the field coils 37. The maximum torque which can be transmitted by the clutch 34 is such that it cannot prevent shaft 35 taking up this unique position thereof when the coils 37 are energised. The minimum torque which can be transmitted by the clutch 34 must be sufficient to drive satisfactorily an indicator which, in the construction shown in Figure 6, is a Selsyn- or magsliptype transmitter 38 coupled to the shaft 35. The construction and mode of operation of the Selsyn-transmitter is not described herein as a full description thereof, and of its mode of operation is contained in an article by T. C. Johnson entitled, "Selsyn Design and Application," Transactions A.I.E.E., October 1945, volume 64, page 703.

The shaft 35 is rotated with the same angular velocity as its co-operating roll until the sensing device engaging the roll senses a bend when a signal transmitted by the signal-initiating device 18 energises the field coils 37 for an interval of time sufficient to effect alignment of the shaft 35 to said unique angular position thereof. By suitably selecting the orientation produced by the coils 37 the shaft 35 can be brought into phase with the bend in the roll on each occasion a signal is transmitted from the signal-initiating means 18.

As mentioned above, each roll has co-operating therewith apparatus as just described although Figure 6 shows only the complete apparatus for roll 4. Figure 6 does, however, show the Selsyn or magslip transmitter 39 for roll 5 and the two Selsyn transmitters 38, 39 are operatively connected with a Selsyn unit known as a differential Selsyn 40. The differential Selsyn 40, according to the signals transmitted from the signal-initiating means 18, 19 and to displacement from a mean position thereof, transmits signals to the switch contacts 28b, 29b similar to the contacts 28, 29 by means of a switch arm 27b fixed to its shaft S and swing with the shaft between contacts 28b and 29b, to control operation of motor 27 in the manner described above to effect operation of the auxiliary driving means for roll 4 and operation of the motor is discontinued when the signals from the Selsyn transmitters 38, 39 to the differential Selsyn 40 restore differential Selsyn 40 to the mean position thereof.

The circuits between the signal-initiating means 18, 19 and the coil 37 may conveniently include lamps 22, 23, as described above, to give a visual indication to the machine operator as to the manner in which the apparatus is functioning.

It will be understood that, if desired, in both examples described above audible indicators may be employed instead of the visual indicators herein described; and that instead of the roll 4 being sensed to locate an outward bend thereon as above described it may be sensed to locate an inward bend thereon, the roll 5 then being sensed to locate an outward bend thereon.

It will also be understood that apparatus as described herein may incorporate any suitable form of sensing devices which will detect a bend in a roll in the manner herein described and initiate a signal whereby the roll angular phase relationship can be changed as required.

It is also to be understood that other electrical and mechanical equivalents of those already exemplified may be used if desired.

I claim:

1. In a glass ribbon producing machine, the combination comprising a pair of rotatable casting rolls of equal diameter between which molten glass is to be fed to form a continuous ribbon of glass of intended thickness, driving means to drive the rolls with equal angular velocities, means for sensing the existence of bends in the rolls and for sensing when the bends in the two rolls are out of phase causing cyclic variations in the thickness of the glass ribbon produced, said means including individual means for sensing the existence of a bend in each of said rolls and normally inoperative auxiliary driving means for one of said casting rolls co-acting with said driving means and operable in accordance with the indications of said sensing means to effect variation of the angular velocity of said one casting roll thereby to cause inward and outward bends occurring in the rolls to be in phase when forming the pass between the rolls to substantially minimize irregularities in ribbon thickness caused by the bends of the rolls.

2. In a glass ribbon producing machine, the combination comprising a pair of rotatable casting rolls of equal diameter between which molten glass is to be fed to form a continuous ribbon of glass of intended thickness, driving means to drive the rolls with equal angular velocities, means for sensing the existence of bends in the rolls and for sensing when the bends in the two rolls are out of phase causing cyclic variations in the thickness of the glass ribbon produced, said means including individual means for sensing the existence of a bend in each of said rolls said driving means including for one roll a differential gearing through which angular movement is transmitted to said one roll, auxiliary driving means co-acting with said differential gearing, and a normally inactive prime mover coupled to said auxiliary driving means and arranged when active to activate the auxiliary driving means thereby through said differential gearing in accordance with the indications of said sensing means to vary the angular velocity of said one roll to cause inward and outward bends occurring in the rolls to be in phase when forming the pass between the rolls to substantially minimize irregularities in ribbon thickness caused by the bends of the rolls.

3. In a glass ribbon producing machine, the combination comprising a pair of rotatable casting rolls of equal diameter between which molten glass is to be fed to form a continuous ribbon of glass of intended thickness, driving means to drive the rolls with equal angular velocities, means for sensing the existence of bends in the rolls and for sensing when the bends in the two rolls are out of phase causing cyclic variations in the thickness of the glass ribbon produced, said means including individual means for sensing the existence of a bend in each of said rolls said driving means including for one roll a differential gearing through which angular movement is transmitted to said one roll, auxiliary driving means coacting with said differential gearing, and a reversible electric motor coupled to said auxiliary driving means and arranged when active to activate the auxiliary driving means thereby through said differential gearing in accordance with the indications of said sensing means to vary the angular velocity of said one roll to cause inward and outward bends occurring in the rolls to be in phase when forming the pass between the rolls to substantially minimize irregularities in ribbon thickness caused by the bends of the rolls.

4. In a glass ribbon producing machine, the combination comprising a pair of rotatable casting rolls of equal diameter between which molten glass is to be fed to form a continuous ribbon of glass of intended thickness, driving means to drive the rolls with equal angular velocities, means for sensing the existence of bends in the rolls and for sensing when the bends in the two rolls are out of phase causing cyclic variations in the thickness of the glass ribbon produced, said means including individual means for sensing the existence of a bend in each of said rolls said driving means including for one roll a differential gearing through which angular movement is transmitted to said one roll, auxiliary driving means coacting with said differential gearing, and a normally inactive manually manipulated prime mover coupled to said auxiliary driving means and arranged when active to activate the auxiliary driving means thereby through said differential gearing in accordance with the indications of said sensing means to vary the angular velocity of said one roll to cause inward and outward bends occurring in the rolls to be in phase when forming the pass between the rolls to substantially minimize irregularities in ribbon thickness caused by the bends of the rolls.

5. In a glass ribbon producing machine, the combination comprising a pair of rotatable casting rolls of equal diameter between which molten glass is to be fed to form a continuous ribbon of glass of intended thickness, driving means to drive the rolls with equal angular velocities, means for sensing the existence of bends in the rolls and for sensing when the bends in the two rolls are out of phase causing cyclic variations in the thickness of the glass ribbon produced, said means including individual means for sensing the existence of a bend in each of said rolls said driving means including for one roll a differential gearing through which angular movement is transmitted to said one roll, auxiliary driving means co-acting with said differential gearing, and a manually manipulated reversible electric motor coupled to said auxiliary driving means and arranged when active to activate the auxiliary driving means thereby through said differential gearing in accordance with the indications of said sensing means to vary the angular velocity of said one roll to cause inward and outward bends occurring in the rolls to be in phase when forming the pass between the rolls to substantially minimize irregularities in ribbon thickness caused by the bends of the rolls.

6. Apparatus comprising a pair of rotatable casting rolls of equal diameter between which molten glass is to be fed to form a continuous ribbon of glass of intended thickness, driving means to drive the rolls with equal angular velocities, normally inoperative manually controllable auxiliary driving means co-acting with said driving means and operable to effect variation of the angular velocity of one of said casting rolls thereby to cause inward and outward bends occurring in the rolls to be in phase when forming the pass between the rolls, a normally inoperative manually controllable prime mover coupled to said auxiliary driving means to effect operation thereof, a first signal-initiating means for said one roll, a second signal-initiating means for the other of the rolls, a first sensing device operatively connected with said first signal-initiating means and arranged continuously to co-operate with said one roll for actuation by an outward bend thereon, a second sensing device operatively connected with said second signal-initiating means and arranged continuously to co-operate with the other of the rolls for actuation by an inward bend on said other roll, and for each roll an indicator operatively connected to the signal-initiating means for the roll and operable by a signal transmitted from the signal-initiating means thereby to give to the manipulator of the auxiliary driving means an indication as to when to effect and when to stop operation of the auxiliary driving means.

7. Apparatus comprising a pair of rotatable casting rolls of equal diameter between which molten glass is to be fed to form a continuous ribbon of glass of intended thickness, driving means to drive the rolls with equal angular velocities, said driving means including for one roll a differential gearing through which angular movement is transmitted to said one roll, auxiliary driving means co-acting with said differential gearing, a manually controllable normally inactive prime mover coupled to said auxiliary driving means and arranged when active to activate the auxiliary driving means thereby through said differential gearing to vary the angular velocity of said one roll to cause inward and outward bends occurring in the rolls to be in phase when forming the pass between the rolls, a first signal-initiating means for said one roll, a second signal-initiating means for the other of the rolls, a first sensing device operatively connected with said first signal-initiating means and arranged continuously to co-operate with said one roll for actuation by an outward bend thereon, a second sensing device operatively connected with said second signal-initiating means and arranged continuously to co-operate with the other of the rolls for actuation by an inward bend on said other roll, and for each roll an indicator operatively connected to the signal-initiating means for the roll and operable by a signal transmitted from the signal-initiating means thereby to give to the manipulator of the prime mover an indication as to when to effect and when to stop operation of the auxiliary driving means.

8. Apparatus comprising a pair of rotatable casting rolls of equal diameter between which molten glass is to be fed to form a continuous ribbon of glass of intended thickness, driving means to drive the rolls with equal angular velocities, said driving means including for one roll a differential gearing through which angular movement is transmitted to said one roll, auxiliary driving means co-acting with said differential gearing, a manually controllable normally inactive prime mover coupled to said auxiliary driving means and arranged when active to activate the auxiliary driving means thereby through said differential gearing to vary the angular velocity of said one roll to cause inward and outward bends occurring in the rolls to be in phase when forming the pass between the rolls, a first signal-initiating means for said one roll, a second signal-initiating means for said one roll, a second signal-initiating means for the other of the rolls, a first sensing device operatively connected with said first signal-initiating means and arranged continuously to co-operate with said one roll for actuation by an outward bend thereon, a second sensing device operatively connected with said second signal-initiating means and arranged continuously to co-operate with the other of the rolls for actuation by an inward bend on said other roll, and for each roll a visual indicator distinctive to the roll with which it co-operates and operatively connected to the signal-initiating means for the roll for operation by a signal transmitted from the signal-initiating means thereby to give to the manipulator of the prime mover an indication as to when to effect and when to stop operation of the auxiliary driving means.

9. In a glass ribbon producing machine, the combination comprising a pair of rotatable casting rolls of equal diameter between which molten glass is to be fed to form a continuous ribbon of glass of intended thickness, driving means to drive the rolls with equal angular velocities, means for sensing the existence of bends in the rolls and for sensing when the bends in the two rolls are out of phase causing cyclic variations in the thickness of the glass ribbon produced, said means including individual means for sensing the existence of a bend in each of said rolls, and normally inoperative means coacting with said driving means for adjusting the driving of at least one of said casting rolls and operable to effect variation of the relative angular velocity of said casting rolls thereby to cause inward and outward bends occurring in the rolls to be in phase when forming the pass between the rolls, to substantially minimize irregularities in ribbon thickness caused by the bends of the rolls, and means for actuating the normally inoperative means to produce such operation thereof.

References Cited in the file of this patent

UNITED STATES PATENTS

| | | |
|---|---|---|
| 1,910,894 | George et al. | May 23, 1933 |
| 2,234,674 | Jacobson | Mar. 11, 1941 |
| 2,696,698 | Davidson et al. | Dec. 14, 1954 |

UNITED STATES PATENT OFFICE
CERTIFICATE OF CORRECTION

Patent No. 2,911,760

November 10, 1959

Richard Barradell-Smith

It is hereby certified that error appears in the printed specification of the above numbered patent requiring correction and that the said Letters Patent should read as corrected below.

Column 2, line 52, strike out "and", second occurrence; column 4, line 44, for "swing" read -- swinging --; column 7, lines 29 and 30, strike out "said one roll, a second signal-initiating means for" --.

Signed and sealed this 26th day of April 1960.

(SEAL)
Attest:

KARL H. AXLINE
Attesting Officer

ROBERT C. WATSON
Commissioner of Patents